Patented July 17, 1928.

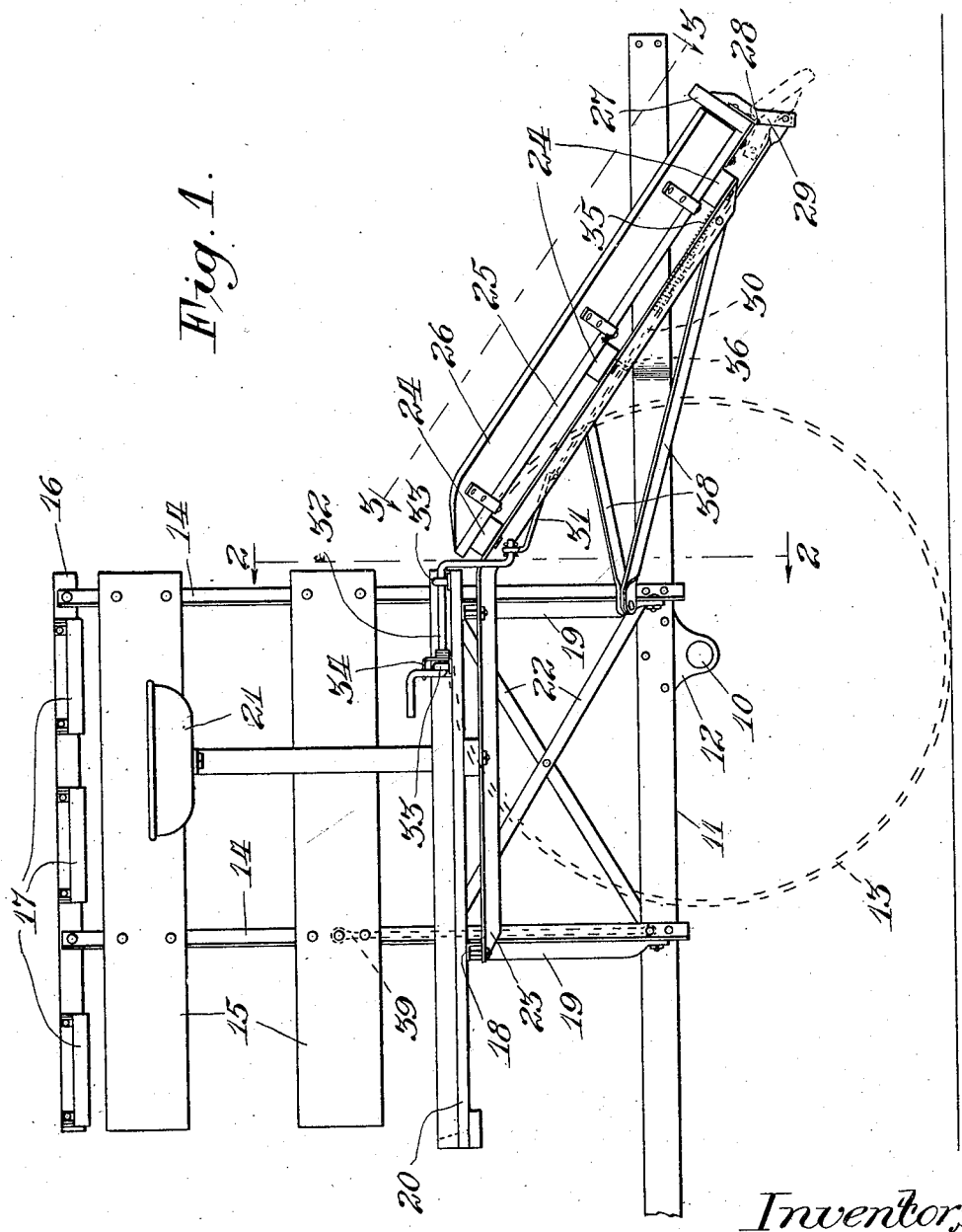

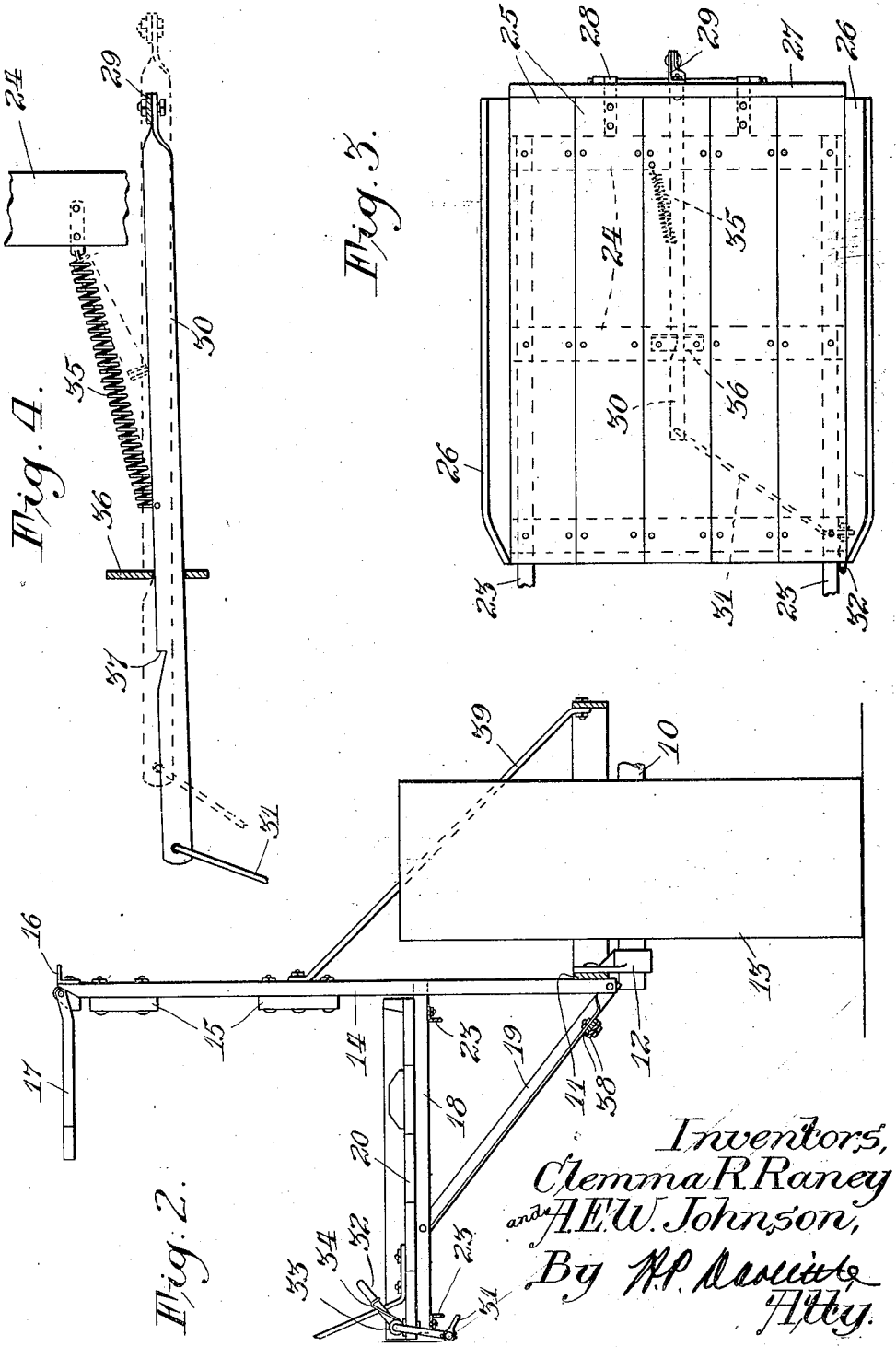

1,677,490

UNITED STATES PATENT OFFICE.

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY.

BAGGING PLATFORM AND CARRIER ATTACHMENT FOR HARVESTER THRASHERS.

Application filed January 21, 1926. Serial No. 82,693.

This invention has to do with harvester thrashers of the type designed to cut standing grain, thrash it and then deliver the thrashed grain by means of appropriate spouts to a bagging platform, where under the control of an operator the grain is put up in bags. More particularly this invention relates to an improved bagging platform for harvester thrashers, the same embodying a novel bag holder or carrier for allowing a number of filled bags to accumulate, and then by means of a novel latching mechanism controlled by the operator, to dump the carrier and deposit the accumulated filled bags in a heap upon the field.

The object of this invention is to provide an improved and efficient bagging platform attachment for harvester thrashers.

Another important object is to provide for such an attachment an improved bag carrier and means for dumping the same to deposit the filled bags upon the field.

In the accompanying sheets of drawings is illustrated an embodiment of this invention which accomplishes the objects stated, and wherein like reference characters designate like parts throughout the several views.

In these drawings, to which reference should now be made,—

Fig. 1 is a side elevational view, illustrating the bagging platform and bag carrier mounted on the frame of a harvester thrasher;

Fig. 2 is an end elevation of the structure shown in Fig. 1, as viewed from the rear of the harvester, as indicated by line 2—2 shown in Fig. 1;

Fig. 3 is a plan view of the bag carrier, per se, as viewed along the line 3—3 of Fig. 1; and Fig. 4 is a detail side view of the latching mechanism which controls the discharge of accumulated filled bags from the carrier platform.

The improved bagging platform and carrier, as already stated, is designed for attachment on harvester thrashers. Such harvester thrasher is indicated generally, so far as is necessary to the present disclosure, and, as shown, comprises a main carrying axle 10 to which is secured a main frame including a longitudinally extending main frame member 11, by means of a suitable bracket 12, the whole structure being supported on the usual carrying wheels 13, only the stubblewardly disposed wheel being shown.

Extending vertically upwardly from the frame member 11, and securely fastened thereto, are standards 14, which have fastened thereto horizontally arranged back boards 15, the upper ends of the standards 14 carrying a cross piece 16, to which are fastened conventional bag holding devices 17. Stubblewardly extending frame pieces 18 are secured to the uprights 14, the frame pieces 18 furthermore being trussed by braces 19, as shown. Longitudinally arranged on the frame pieces 18 are the floor boards forming the operator's platform 20, with a seat 21 carried thereon in a position facing the bag holders 17. Cross braces 22 are provided to truss and strengthen the frame structure, as shown.

Carried below and fastened to the frame of the platform are longitudinally and rearwardly extending, spaced frame members 23 which, beyond the rear end of the platform, are sharply downwardly bent. Cross plates 24 are fastened to the angular extension of the members 23, and to these plates are secured boards 25 to form an inclined bag carrier, the carrier having upwardly inclined side boards 26 secured thereto in any suitable manner.

An end board 27 is hinged to the inclined carrier platform by means of a hinge 28, the end board having an arm 29 secured thereto and extending a slight distance downwardly therefrom. A latch bar 30 is connected at one end to the lower end of the arm 29, as shown, the other end of the bar being loosely connected to a link 31, which link in turn has an eye at its forward end, loosely connecting with a depending arm of a crank 32 journaled in eyes 33 secured to the operator's platform. Another crank portion extends upwardly from the crank 32 and is conveniently arranged with respect to the foot of an operator seated on the seat 21. A spring 34 serves to hold the crank in position to help keep the tail board 27 up. A second spring 35 fastened at one end to a cross plate 24 and at its other end to the latch bar 30 also functions to hold the tail board in its up position for the purpose of retaining filled bags on the carrier.

It is to be noted that the intermediate cross plate 24 carries centrally thereon in line with the latch bar 30, a small depending plate 36, the latch bar being provided with a notch 37, the plate 36 and notch 37 cooperating to form a positive locking means for retaining the tail board 27 in its raised or up position.

A short summary of the operation and use of the structure of this invention will now be made. Bags are supported in the usual way on the holders 17, an operator being seated on the seat 21 and watching the bags as they fill. When a bag has been filled, the operator sews it shut and, having removed the filled bag from the holder, throws it upon the inclined carrier platform, the tail board 27 being normally locked in up position by the latching mechanism described, and preventing discharge of the bag. In this manner a number of bags are permitted to accumulate. When the carrier is filled, or when the operator arrives at a dumping point in the field, he trips the upstanding arm on the crank 32 with his foot, thereby, through the link 31, pulling on the latch bar 30 and unseating the notch 37 from the plate 36 to move the tail board downwardly, whereupon the bags slide down the inclined carrier and are discharged upon the field in a heap. While the filled bags are sliding down the carrier the tail board, of course, remains down, because of the weight of the filled bags, but when the bags have all been dumped, the springs 35 and 34 act quickly to return the tail board and latch bar to normal locked position with the tail board up.

The inclined carrier frame is strengthened by braces 38 and the entire platform and carrier may be further secured to the harvester thrasher frame by a brace 39.

It is also to be observed that the improved bagging platform and carrier is so disposed on the harvester thrasher that the weight thereof is evenly distributed on the axle 10 of the machine, so as nearly as possible to maintain equilibrium thereof on the axle as a fulcrum.

It should be understood that only an illustrative embodiment of the invention has been described and illustrated and that the same may assume various modifications and is capable of structural changes without departing from the spirit and scope thereof as indicated in the subjoined claims.

What we claim is:

1. The combination with a harvester thrasher having a transverse axle and a frame, of a bagging platform and bag carrier attachment therefor, said attachment comprising a horizontally disposed operator's platform carried on the frame substantially entirely forwardly of the axle and an inclined chute disposed substantially rearwardly of the axle, a normally locked tail board for the chute, and means for releasing the tail board to dump the load from the chute.

2. The combination with a harvester thrasher having an axle and a main frame, of a bagging platform and carrier attachment therefor, comprising a horizontally disposed platform carried on the main frame and positioned substantially entirely to one side of said axle, and an inclined bag carrier extending from the horizontally disposed platform, said inclined carrier being supported on the main frame entirely on the opposite side of said axle.

In testimony whereof we affix our signatures.

CLEMMA R. RANEY.
ARNOLD E. W. JOHNSON.